US012559124B2

(12) United States Patent (10) Patent No.: US 12,559,124 B2

Iwase et al. (45) Date of Patent: Feb. 24, 2026

(54) DRIVING SUPPORT DEVICE

(71) Applicant: TOYOTA JIDOSHA KABUSHIKI KAISHA, Toyota (JP)

(72) Inventors: Toshifumi Iwase, Tokyo (JP); Hironori Ito, Tokyo (JP); Hisanobu Inoue, Kawasaki (JP); Takahiro Kawano, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 145 days.

(21) Appl. No.: 18/672,517

(22) Filed: May 23, 2024

(65) Prior Publication Data

US 2024/0400081 A1 Dec. 5, 2024

(30) Foreign Application Priority Data

May 30, 2023 (JP) ................................. 2023-088673

(51) Int. Cl.
B60W 50/14 (2020.01)
B60W 30/182 (2020.01)
B60W 50/10 (2012.01)

(52) U.S. Cl.
CPC .......... B60W 50/14 (2013.01); B60W 30/182 (2013.01); B60W 50/10 (2013.01); B60W 2050/146 (2013.01)

(58) Field of Classification Search
CPC .... B60W 50/14; B60W 30/182; B60W 50/10; B60W 2050/146
See application file for complete search history.

(56) References Cited

U.S. PATENT DOCUMENTS

| | | | | |
|---|---|---|---|---|
| 2017/0140651 A1* | 5/2017 | Lee | ........................ | B60Q 1/324 |
| 2018/0091085 A1* | 3/2018 | Tamagaki | ............ | G08G 1/0962 |
| 2018/0297611 A1* | 10/2018 | Fujisawa | .............. | G05D 1/0212 |
| 2018/0329414 A1* | 11/2018 | Igarashi | .............. | B60W 50/082 |
| 2020/0180645 A1* | 6/2020 | Itoh | ...................... | G06V 20/597 |
| 2020/0265736 A1* | 8/2020 | Koga | ..................... | G09B 9/042 |
| 2022/0315029 A1* | 10/2022 | Suzuki | .................. | B60W 30/09 |

FOREIGN PATENT DOCUMENTS

| | | |
|---|---|---|
| JP | 2002-230587 A | 8/2002 |
| JP | 2017-167199 A | 9/2017 |
| JP | 2019-086741 A | 6/2019 |
| JP | 2019-148677 A | 9/2019 |
| JP | 2019-174741 A | 10/2019 |
| JP | 2022-159189 A | 10/2022 |

* cited by examiner

*Primary Examiner* — Lindsay M Low
*Assistant Examiner* — Susan E Scharpf
(74) *Attorney, Agent, or Firm* — Dinsmore & Shohl LLP

(57) ABSTRACT

A driving support device includes an operation unit configured to receive an operation of a driver related to driving support of a vehicle; a driving control unit configured to execute the driving support based on the operation of the driver; a storage unit configured to store an explanation of the driving support corresponding to the operation unit; a notification unit configured to provide the explanation of the driving support to the driver through any one of augmented reality, mixed reality and virtual reality; and a control unit connected to the driving control unit, the notification unit, and the storage unit, configured to switch between a travel mode and an explanation mode and to operate in a mode switched.

5 Claims, 3 Drawing Sheets

DRIVING SUPPORT DEVICE

CROSS-REFERENCE TO RELATED APPLICATION

This application is based on Japanese Patent Application No. 2023-088673 filed with Japan Patent Office on May 30, 2023, the entire contents of which are hereby incorporated by reference.

TECHNICAL FIELD

The present disclosure relates to a driving support device.

BACKGROUND

Japanese Patent Application Publication No. 2002-230587 discloses a system in which a computer supports a user to virtually experience an effect of a support function mounted on a vehicle. The system includes a server owned by an entity that manufactures or sells a vehicle and a client terminal used by a user who is a potential customer of the vehicle. The client terminal communicates with the server and displays images that the driver seated in the driver's seat of the vehicle will see while driving. The server receives a mouse operation of the client terminal and causes the client terminal to display an image in a state in which a support function mounted on the vehicle is exhibited.

SUMMARY

In the system described in Japanese Patent Application Publication No. 2002-230587, a user cannot perform simulated experience using an actual vehicle. For this reason, the user may not sufficiently understand the support function. The present disclosure provides a driving support device that enables a driver to learn or understand a function of driving support.

A driving support device according to an embodiment of the present disclosure includes an operation unit, a driving control unit, a storage unit, a notification unit, and a control unit. The operation unit receives an operation of a driver related to driving support of a vehicle. The driving control unit executes driving support based on an operation of the driver. The storage unit stores an explanation of driving support corresponding to the operation unit. The notification unit provides an explanation of driving support to the driver in any one of augmented reality, mixed reality and virtual reality. The control unit is connected to the driving control unit, the notification unit, and the storage unit. The control unit is configured to switch between a travel mode and an explanation mode and to operate in a mode switched. The travel mode is a mode in which the vehicle is caused to travel while executing the driving support based on the operation of the driver by the driving control unit, and the explanation mode is a mode in which the operation of the driver is not reflected in travel of the vehicle and the notification unit is operated to provide the explanation of the driving support stored in the storage unit to the driver.

In the driving support device, a travel mode and an explanation mode are switched and executed. In the travel mode, the vehicle travels while executing driving support based on an operation of the driver by the driving control unit. In the explanation mode, the operation of the driver is not reflected in the traveling of the vehicle, and the explanation of the driving support is provided to the driver by any one method of augmented reality, mixed reality and virtual reality. In this manner, in the explanation mode, even if the driver operates the operation unit of the actual vehicle, the operation is not reflected in the traveling. Therefore, it is possible to explain the driving support while causing the driver to operate the operation unit of the actual vehicle. Accordingly, the driving support device can cause the driver to learn or understand the function of the driving support.

In one embodiment, the notification unit may provide an explanation of driving support to the driver in augmented reality or mixed reality. In this case, since the driving support device can superimpose the explanation image or the three-dimensional object to correspond to the operation unit visually recognized by the driver, it is possible to further cause the driver to learn or understand the function of the driving support.

In one embodiment, the explanation of the driving support corresponding to the operation unit may include at least one of an operating method and an operation timing of the operation unit. In this case, the driving support device may allow the driver to learn or understand at least one of the operating method and the operation timing of the operation unit.

In one embodiment, the control unit may cause the notification unit to superimpose an operation guide on an image of the operation unit, or to superimpose an operation guide on a field of view of the driver when visually recognizing the operation unit. The driving support device may present an operation guide to the driver to allow the driver to further learn or understand an operating method and an operation timing of the operation unit.

In one embodiment, the control unit may cause the notification unit to suggest driving support operating in the explanation mode to the driver. The driving support device enables the driver to learn or understand even a driving support function that the driver does not know.

According to the present disclosure, it is possible to cause a driver to learn or understand a function of driving support.

DETAILED DESCRIPTION

Hereinafter, embodiments of the present disclosure will be described with reference to the drawings.
[Configuration of Vehicle]

Figure 1:
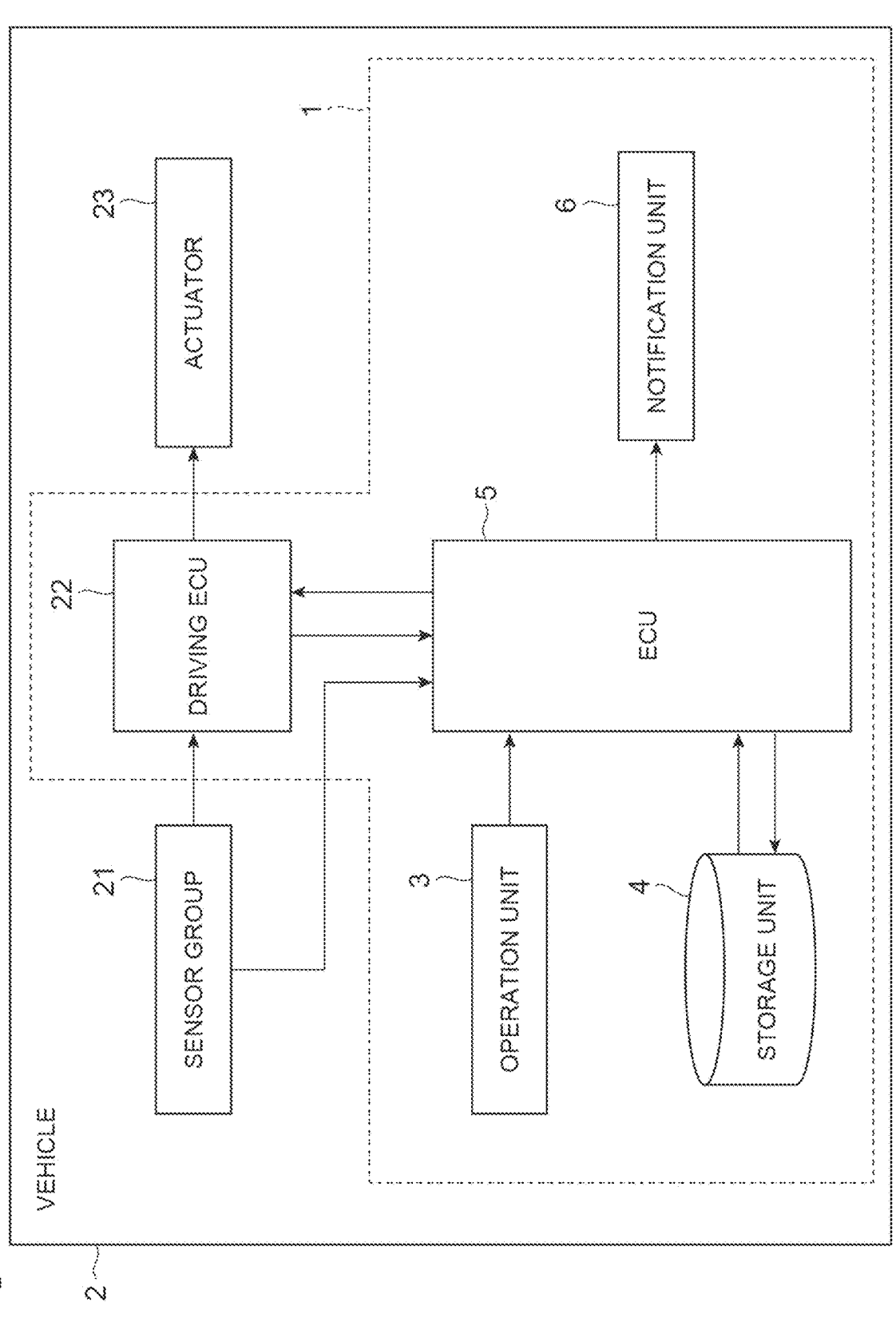
FIG. 1 is a block diagram illustrating an example of a configuration of a vehicle including a driving support device according to an embodiment.

FIG. 1 is a block diagram illustrating an example of a configuration of a vehicle including a driving support device according to an embodiment. As shown in FIG. 1, a driving support device 1 is mounted on a vehicle 2 as an example. The vehicle 2 is a vehicle to which driving support is provided. The driving support may be a state in which the driving operation including the brake operation, the accelerator operation, and the handle operation is partially autonomously executed, a state in which all the driving tasks are autonomously executed on condition that a preset traveling condition is satisfied, or a state in which all the driving tasks are autonomously executed without setting a condition.

Examples of the driving support include a lane keeping function, an inter-vehicle distance control function, a start function, a stop function, a lane change function, a right/left turn function, a collision suppression function, and a parking function.

The vehicle 2 includes a driving ECU 22 for performing driving support. The electronic control unit (ECU) is an electronic control unit including a central processing unit (CPU), a read only memory (ROM), a random-access memory (RAM), a controller area network (CAN) communication circuit, and the like. The driving support is realized by operating an actuator 23 that the driving ECU 22 is the vehicle 2 based on at least the detection result of a sensor group 21.

The sensor group 21 includes, for example, a sensor that detects the surrounding environment of the vehicle 2 and a sensor that detects the traveling state of the vehicle 2. The sensor that detects the surrounding environment of the vehicle 2 includes, for example, at least one of a camera and a radar sensor. Examples of the sensor that detects the driving state of the vehicle 2 include a global positioning system (GPS) receiver, a vehicle speed sensor, an acceleration sensor, and a yaw rate sensor.

The actuator 23 is a device used for travel control of the vehicle 2. The actuator 23 may include at least a drive actuator, a brake actuator, and a steering actuator.

The driving ECU 22 performs driving support based on an operation of the driver. The operation of the driver is not particularly limited if it relates to the function of driving support. For example, the operation of the driver may be a start operation and a stop operation for starting and stopping the function of the driving support, or may be an operation related to traveling of the vehicle 2 such as a brake operation, an accelerator operation, and a handle operation during the driving support. The driving ECU 22 may only execute the driving support based on the start operation, or may reflect a brake operation, an accelerator operation, a handle operation, or the like of the driver on the traveling of the vehicle 2 during the driving support.

[Configuration of Driving Support Device]

The driving support device 1 includes, for example, an operation unit 3, a storage unit 4, a notification ECU 5 (an example of a control unit), and a notification unit 6, in addition to the driving ECU 22 described above.

The operation unit 3 receives an operation of the driver related to driving support of the vehicle 2. The operation unit 3 is, for example, an operation button related to driving support, a brake pedal, an accelerator pedal, a handle, or the like.

The storage unit 4 is a storage device that stores an explanation of driving support corresponding to the operation unit 3. The explanation of the driving support corresponding to the operation unit 3 includes at least one of an operating method and an operation timing of the operation unit 3. The explanation of the driving support may be information for exhibiting the function of the driving support, such as an operating method and an operation timing of a button for starting the driving support, an operating method and an operation timing of a button for ending the driving support, and an operating method and an operation timing of a button for changing a set speed, or information about a setting related to the driving support. The explanation of the driving support may be, for example, content describing how the operation of the driver during the driving support is reflected in the traveling of the vehicle 2. The explanation of the driving support is prepared corresponding to the operation unit 3. For example, when the operation unit

3 is an operation button, the explanation of the driving support is the explanation of the operation button. Alternatively, when the operation unit 3 is a brake pedal, the explanation of the driving support is an explanation of the brake pedal.

The notification unit 6 is a device that notifies the driver of information. For example, the notification unit 6 provides an explanation of driving support to the driver in any one of augmented reality, mixed reality and virtual reality. The notification unit 6 provides information to the driver in augmented reality, for example. Augmented reality is a technique for superimposing digital information on the real world. To be more specific, the notification unit 6 acquires an image (including a video) with the same camera line of sight as the line of sight of the driver, combines information or content with the image, and provides the driver with an image in which information is superimposed on the real world. The notification unit 6 may superimpose the operation unit 3 operation guide on the image of the operation unit 3. The operation guide is information indicating how to move the operation unit 3. By providing an operation guide, the driver can deeply understand the operation unit 3.

Alternatively, the notification unit 6 may prepare a transparent display and cause the display to display information or content for the driver who visually recognizes the operation unit 3 via the display to superimpose the information on the real world. The notification unit 6 may superimpose the operation guide of the operation unit 3 on the field of view of the driver who views the operation unit 3. By providing an operation guide, the operation unit 3 comprehension is improved.

The notification unit 6 may provide information to the driver in mixed reality, for example. Mixed reality is a technique for superimposing digital information on the real world in the same manner as augmented reality, and is a technique capable of providing a driver with more realistic information than augmented reality, such as a three-dimensional object. In the mixed reality, similarly to the augmented reality, information may be superimposed on an image, or information may be displayed on a transparent display through which a driver looks. In this case, the notification unit 6 is a mixed reality (MR) device capable of providing augmented reality.

The notification unit 6 may provide information to the driver in virtual reality, for example. The virtual reality is a technology for providing a virtual space, and is a technology capable of simulating the real world. In the case of providing information in virtual reality, the notification unit 6 is a virtual reality (VR) device. In the virtual reality, various simulations are possible. The driver may operate the operation unit 3 while staying in virtual reality.

The notification unit 6 may be a head-mounted display that can be worn on the driver's head. As a result, the driver can sit on the driver's seat even in a narrow cabin and experience switch operation and vehicle behavior. In this way, the reality of information provided by any one of augmented reality, mixed reality and virtual reality is improved.

The notification ECU 5 is connected to the driving ECU 22, the operation unit 3, the storage unit 4, and the notification unit 6. The notification ECU 5 is an electronic control unit including a CPU, a ROM, a RAM, a CAN communication circuit, and the like. The notification ECU 5 may be an ECU in which a plurality of ECUs is integrated.

The notification ECU 5 switches between a travel mode and an explanation mode, and operates in the mode switched. For example, the notification ECU 5 switches between the travel mode and the explanation mode based on an instruction from the driver. The travel mode is a mode in which the driving ECU 22 causes the vehicle 2 to travel while performing driving support based on an operation of the driver. In this case, the notification ECU 5 outputs all the instructions of the driver received by the operation unit 3 to the driving ECU 22. As a result, the driving ECU 22 can acquire the operation for starting the driving support, the setting operation, the handle operation during the driving support, and the like, and reflect the acquired operations on the traveling of the vehicle 2.

The explanation mode is a mode in which the notification unit 6 is operated to provide the explanation of the driving support stored in the storage unit 4 to the driver without reflecting the operation of the driver on the traveling of the vehicle 2. That is, in a case where the explanation mode is selected, the operation button related to driving support is operable but is disabled, and the instruction of the driver received by the operation unit 3 is not output to the driving ECU 22. Alternatively, the driver's instruction received by the operation unit 3 may be output to the driving ECU 22, but the by-wire technology may be used to prohibit the actuator 23 from operating for driving support.

Then, the notification ECU 5 provides the explanation of the driving support stored in the storage unit 4 to the driver. When the driver actually views the operation unit 3 and recognizes the operation unit 3, the notification ECU 5 provides the driver with an explanation of driving support corresponding to the operation unit 3 by using augmented reality or mixed reality. When the driver recognizes the operation unit 3 by viewing the image capturing the operation button, the notification ECU 5 provides the driver with an explanation of the driving support corresponding to the operation unit 3 by using augmented reality or mixed reality. When the driver recognizes the operation button by viewing the operation button created in the virtual space, the notification ECU 5 provides the driver with an explanation of driving support corresponding to the operation unit 3 in virtual reality.

The notification ECU 5 may utilize by-wire technology to provide a reaction force to the operation unit 3 to enhance reality. In addition, the notification ECU 5 may output signals such as an accelerator, a brake, a handle, and a shift to the notification unit 6 by using a by-wire technology without adding a sensor or an output device and perform image creation and reaction force generation, thereby providing feedback to the driver. Thus, in the real world or a virtual space close to reality, the driver can experience driving support while operating the operation unit 3.

The notification ECU 5 may operate the notification unit 6 to suggest driving support to the driver that operates in an explanation mode. For example, the notification ECU 5 stores a history (use result) of the driving support that operates in the explanation mode. As an example, the notification ECU 5 stores a history of driving support executed in the explanation mode in the storage unit 4. The notification ECU 5 refers to the storage unit 4 and determines the driving support having a small number of executions from the history of the driving support as the recommended driving support. This allows the driver to learn or understand even a driving support function that the driver does not know. Alternatively, the notification ECU 5 may aggregate the understanding of the driver in a questionnaire in the explanation mode, and determine the driving support with insufficient understanding as the recommended driving support. This makes it possible to efficiently compensate for the lack of understanding of the driver.

[Operation of Driving Support Device]

Figure 2:
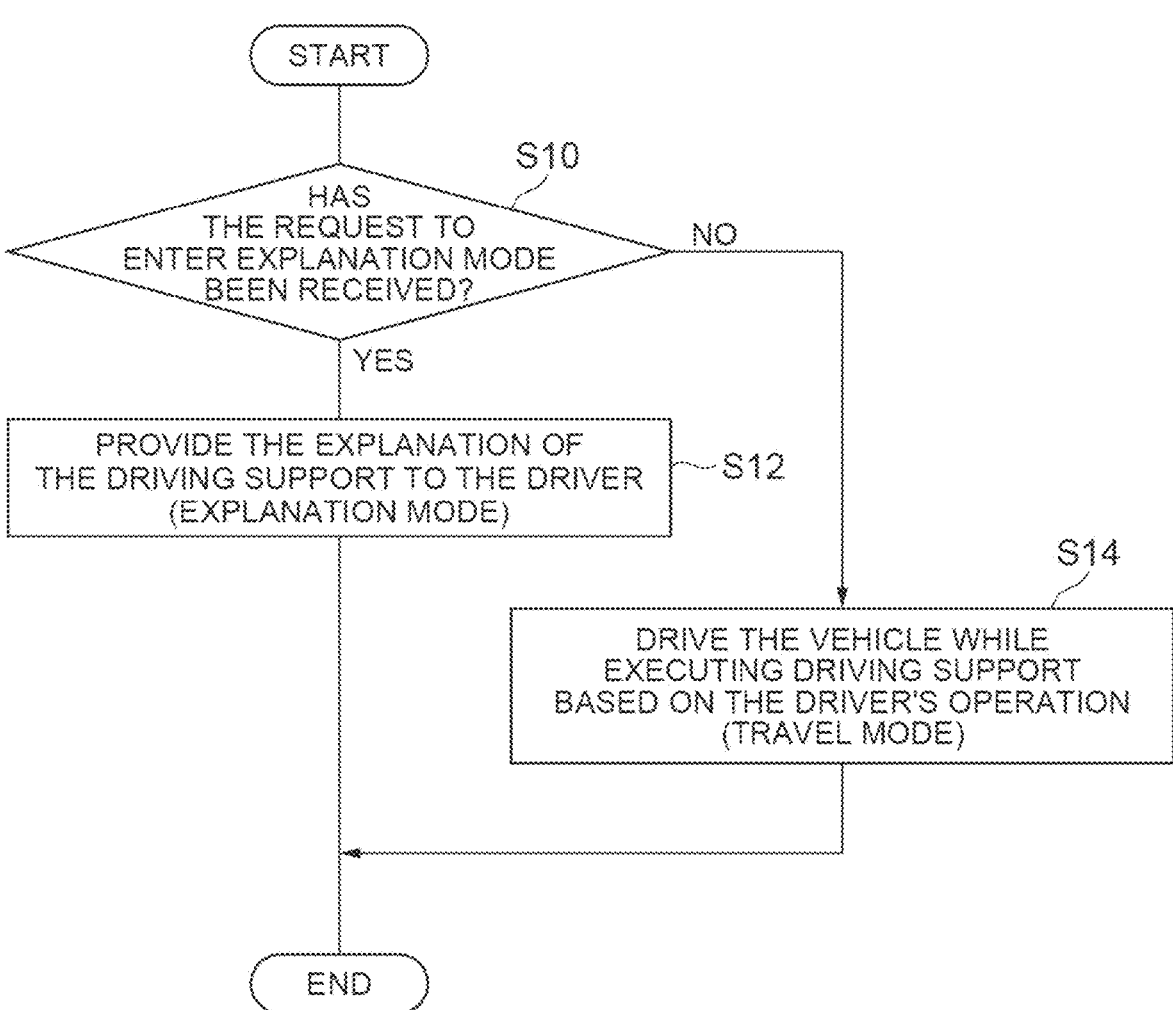
FIG. 2 is a flowchart illustrating an operation of the driving support device.

FIG. 2 is a flowchart illustrating an operation of the driving support device. The flowchart shown in FIG. 2 is started when the driving support device 1 receives a start instruction operation.

As shown in FIG. 2, first, the notification ECU 5 in the driving support device 1 determines whether an instruction of the explanation mode has been received (step S10). When it is determined that the instruction of the explanation mode is received via the operation unit 3 or the like (step S10: YES), the notification ECU 5 operates in the explanation mode (step S12). In step S12, the notification ECU 5 does not reflect the operation of the driver on the traveling of the vehicle 2, and causes the notification unit 6 to provide the explanation of the driving support stored in the storage unit 4 to the driver.

When it is determined that the instruction of the explanation mode is not received (step S10: NO), the notification ECU 5 operates in the travel mode (step S14). In step S14, the notification ECU 5 outputs all the instructions of the driver received by the operation unit 3 to the driving ECU 22, and causes the driving ECU 22 to exert the function of driving support.

When step S12 or step S14 ends, the flowchart shown in FIG. 2 ends. In this manner, the travel mode and the explanation mode are switched and executed.

Figure 3:
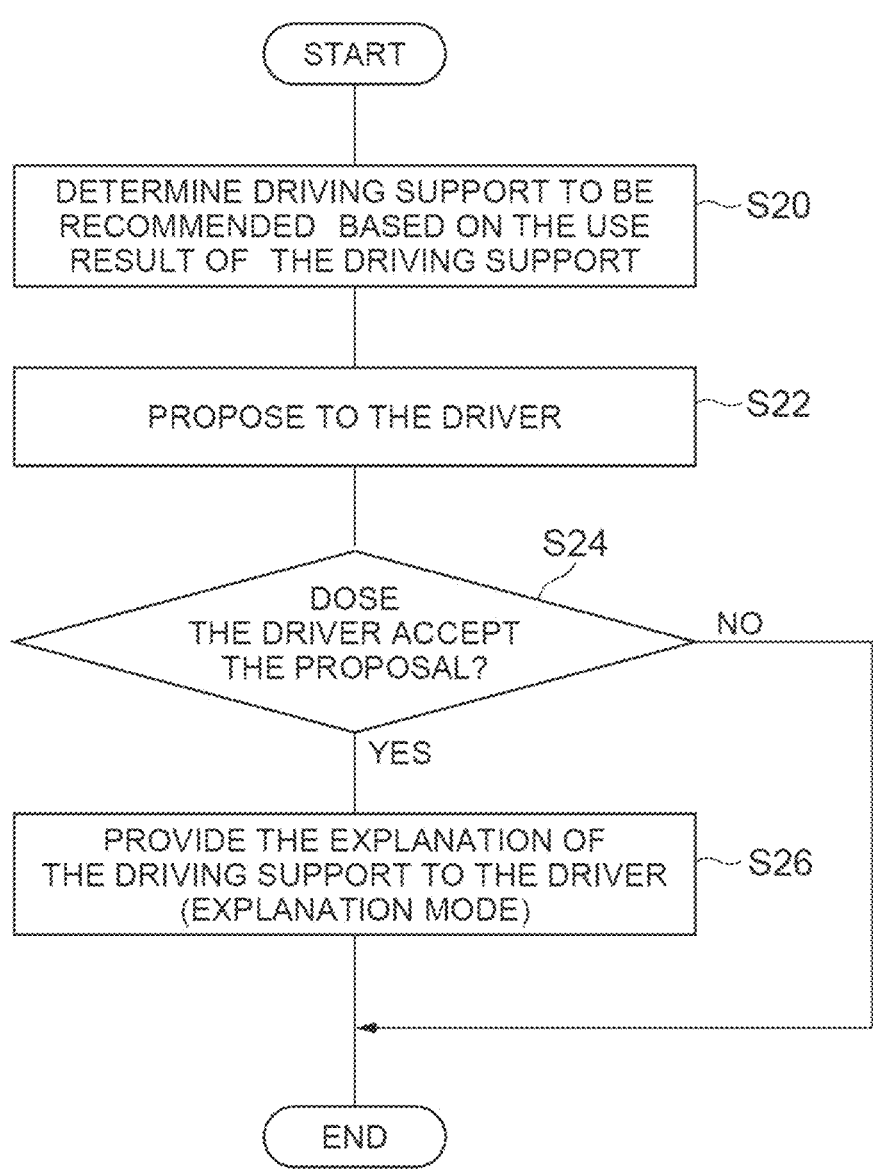
FIG. 3 is a flowchart illustrating another operation of the driving support device.

Next, another operation of the driving support device will be described. FIG. 3 is a flowchart illustrating another operation of the driving support device. The flowchart shown in FIG. 3 is started when the driving support device 1 receives a start instruction operation.

As illustrated in FIG. 3, first, the notification ECU 5 in the driving support device 1 refers to the storage unit 4 and determines driving support to be recommended based on the use result of the driving support (step S20). Subsequently, the notification ECU 5 proposes the recommended driving support determined in step S20 to the driver (step S22). For example, the notification ECU 5 proposes driving support recommended through the notification unit 6 to the driver.

Subsequently, the notification ECU 5 determines whether or not the driver has accepted the proposal (step S24). When it is determined that the driver has accepted the suggestion (step S24: YES), the notification ECU 5 operates in the explanation mode (step S26). In step S26, the notification ECU 5 does not reflect the operation of the driver on the traveling of the vehicle 2, and causes the notification unit 6 to provide the explanation of the recommended driving support to the driver.

When step S26 ends, or when it is determined that the driver does not accept the suggestion (step S24: NO), the flowchart illustrated in FIG. 3 ends. In this way, the driving support described in the explanation mode is proposed.

SUMMARY OF EMBODIMENT

According to the driving support device 1, the travel mode and the explanation mode are switched and executed. In the travel mode, the vehicle 2 travels while performing driving support based on the operation of the driver by the driving ECU 22. In the explanation mode, the operation of the driver is not reflected in the traveling of the vehicle 2, and the explanation of the driving support is provided to the driver by any one method of augmented reality, mixed reality and virtual reality. In this manner, in the explanation mode, even if the driver operates the operation unit 3 of the actual the vehicle 2, the operation is not reflected in the traveling. Therefore, it is possible to explain the driving support while causing the driver to operate the operation unit 3 of the actual the vehicle 2. Accordingly, the driving support device 1 can cause the driver to learn or understand the function of the driving support. In the moving image explanation of the third-person viewpoint, the behavior and image when actual driving may be different. Further, in a general-purpose moving image common to vehicle types, the arrangement of switches is different from that of an actual purchased vehicle, and smooth operation may not be performed. According to the driving support device 1, it is possible to understand and experience a function while performing an operation using an actual vehicle.

While exemplary embodiments have been described above, various omissions, substitutions, and changes may be made without being limited to the exemplary embodiments described above. For example, the driving support of the vehicle 2 does not exclude the full-autonomous driving, and the simulation in the case where the driver urgently avoids in the full-autonomous driving may be performed by the vehicle 2.

The storage unit 4 may be a cache (temporary storage medium) used when information is exchanged by communication or a communication buffer. That is, the driving support device 1 does not need to store a part or all the explanation of the driving support on the vehicle 2 side, and the explanation of the driving support may be provided to the driving support device 1 through communication as needed. Alternatively, the storage unit 4 may be integrated with the notification ECU 5 storage unit. The explanation of the driving support stored in the storage unit 4 may be updated by wireless or wired communication.

The present disclosure also includes the following clauses:

[Clause 1]

A driving support device comprising:

an operation unit configured to receive an operation of a driver related to driving support of a vehicle;

a driving control unit configured to execute the driving support based on the operation of the driver;

a storage unit configured to store an explanation of the driving support corresponding to the operation unit;

a notification unit configured to provide the explanation of the driving support to the driver through any one of augmented reality, mixed reality and virtual reality; and a control unit connected to the driving control unit, the notification unit, and the storage unit, configured to switch between a travel mode and an explanation mode and to operate in a mode switched, wherein the travel mode is a mode in which the vehicle is caused to travel while executing the driving support based on the operation of the driver by the driving control unit, and the explanation mode is a mode in which the operation of the driver is not reflected in travel of the vehicle and the notification unit is operated to provide the explanation of the driving support stored in the storage unit to the driver.

[Clause 2]

The driving support device of clause 1, wherein the notification unit provides the explanation of the driving support to the driver in augmented reality or mixed reality.

[Clause 3]

The driving support device according to clause 1 or 2, wherein the explanation of the driving support corresponding to the operation unit includes at least one of an operating method and an operation timing of the operation unit.

[Clause 4]

The driving support device according to any one of clauses 1 to 3, wherein the control unit causes the notification unit to superimpose an operation guide on an image of the operation unit, or to superimpose an operation guide on a field of view of the driver when visually recognizing the operation unit.

[Clause 5]

The driving support device according to any one of clauses 1 to 4, wherein the control unit causes the notification unit to suggest driving support operating in the explanation mode to the driver.

REFERENCE SIGNS LIST

1: driving support device, 2: vehicle, 3: operation unit, 4: storage unit, 5: notification ECU (an example of a control unit), 6: notification unit, 22: driving ECU

What is claimed is:

1. A driving support device comprising:

an operation unit configured to receive an operation of a driver related to driving support of a vehicle;

a driving control unit configured to execute the driving support based on the operation of the driver;

a storage unit configured to store an explanation of the driving support corresponding to the operation unit;

a notification unit configured to provide the explanation of the driving support to the driver through any one of augmented reality, mixed reality and virtual reality; and a control unit connected to the driving control unit, the notification unit, and the storage unit, configured to switch between a travel mode and an explanation mode and to operate in a mode switched, wherein the travel mode is a mode in which the vehicle is caused to travel while executing the driving support based on the operation of the driver by the driving control unit, and the explanation mode is a mode in which the operation of the driver is not reflected in travel of the vehicle and the notification unit is operated to provide the explanation of the driving support stored in the storage unit to the driver.

2. The driving support device according to claim 1, wherein the notification unit provides the explanation of the driving support to the driver in augmented reality or mixed reality.

3. The driving support device according to claim 1, wherein the explanation of the driving support corresponding to the operation unit includes at least one of an operating method and an operation timing of the operation unit.

4. The driving support device according to claim 1, wherein the control unit causes the notification unit to superimpose an operation guide on an image of the operation unit, or to superimpose an operation guide on a field of view of the driver when visually recognizing the operation unit.

5. The driving support device according to claim 1, wherein the control unit causes the notification unit to suggest driving support operating in the explanation mode to the driver.

* * * * *